(12) United States Patent
Haefner et al.

(10) Patent No.: US 12,365,111 B2
(45) Date of Patent: Jul. 22, 2025

(54) METHOD FOR PRODUCING A BUILDING COMPONENT, SYSTEM FOR PRODUCING A BUILDING COMPONENT AND BUILDING COMPONENT

(71) Applicant: Putzmeister Engineering GmbH, Aichtal (DE)

(72) Inventors: Jens Haefner, Stuttgart (DE); Tobias Huth, Stuttgart (DE); Knut Kasten, Ostfildern (DE); Peter Moegle, Leinfelden (DE)

(73) Assignee: Putzmeister Engineering GmbH, Aichtal (DE)

( * ) Notice: Subject to any disclaimer, the term of this patent is extended or adjusted under 35 U.S.C. 154(b) by 535 days.

(21) Appl. No.: 17/593,777

(22) PCT Filed: Mar. 25, 2020

(86) PCT No.: PCT/EP2020/058318
§ 371 (c)(1),
(2) Date: Sep. 24, 2021

(87) PCT Pub. No.: WO2020/193614
PCT Pub. Date: Oct. 1, 2020

(65) Prior Publication Data
US 2022/0184846 A1   Jun. 16, 2022

(30) Foreign Application Priority Data
Mar. 27, 2019 (DE) ............ 10 2019 204 230.9

(51) Int. Cl.
*B33Y 10/00* (2015.01)
*B28B 1/00* (2006.01)
(Continued)

(52) U.S. Cl.
CPC .......... *B28B 1/001* (2013.01); *B28B 23/0025* (2013.01); *E04G 21/04* (2013.01);
(Continued)

(58) Field of Classification Search
USPC .......................................... 264/129; 624/129
See application file for complete search history.

(56) References Cited

U.S. PATENT DOCUMENTS 5,950,321 A * 9/1999 Pena .................. E04D 13/00
33/759
7,641,461 B2   1/2010 Khoshnevis
(Continued)

FOREIGN PATENT DOCUMENTS

CN   106149863 A   11/2016
CN   206048448 U   3/2017
(Continued)

OTHER PUBLICATIONS

International Search Report (PCT/ISA/210) issued in PCT Application No. PCT/EP2020/058318 dated Jul. 6, 2020 with English translation (five (5) pages).
German-language Written Opinion (PCT/ISA/237) issued in PCT Application No. PCT/EP2020/058318 dated Jul. 6, 2020 (six (6) pages).
(Continued)

*Primary Examiner* — Jacob T Minskey
(74) *Attorney, Agent, or Firm* — Crowell & Moring LLP

(57) ABSTRACT

A method produces a part of a building. The part of a building has at least one first region and one second region, which adjoins the first region. In the first region, an installation structure is concealed by building material. The method includes the following steps: a) dispensing building material to produce the first region and providing the building material with a marking substance before, at the same time as, and/or after the dispensing operation, and b) dispensing building material to produce the second region.

8 Claims, 6 Drawing Sheets

(51) Int. Cl.
*B28B 23/00* (2006.01)
*E04G 21/04* (2006.01)
*B33Y 30/00* (2015.01)
*B33Y 80/00* (2015.01)

(52) U.S. Cl.
CPC .............. *B33Y 10/00* (2014.12); *B33Y 30/00* (2014.12); *B33Y 80/00* (2014.12); *E04G 2021/049* (2013.01)

(56) References Cited

U.S. PATENT DOCUMENTS

| | | | |
|---|---|---|---|
| 2002/0138228 A1 | 9/2002 | Faulkner et al. | |
| 2014/0163727 A1* | 6/2014 | Siamer | G07F 7/0609 700/242 |
| 2014/0252668 A1 | 9/2014 | Austin et al. | |
| 2015/0239148 A1 | 8/2015 | Israel | |
| 2017/0203468 A1 | 7/2017 | Sherman et al. | |
| 2018/0071949 A1 | 3/2018 | Giles | |
| 2021/0395997 A1* | 12/2021 | Comber | E04B 1/2604 |

FOREIGN PATENT DOCUMENTS

| | | |
|---|---|---|
| CN | 107246150 A | 10/2017 |
| CN | 109016491 A | 12/2018 |
| DE | 40 26 009 A1 | 2/1992 |
| DE | 10 2007 025 494 A1 | 12/2008 |
| EP | 2 266 930 A1 | 12/2010 |
| EP | 1 587 995 B1 | 3/2012 |
| EP | 2 886 277 A1 | 6/2015 |
| FR | 3 060 043 A1 | 6/2018 |
| JP | 2005-107680 A | 4/2005 |
| JP | 2013-44207 A | 3/2013 |
| KR | 10-2018-0012432 A | 2/2018 |
| WO | WO 2019/048752 A1 | 3/2019 |

OTHER PUBLICATIONS

German-language Office Action issued in German Application No. 10 2019 204 230.9 dated Jan. 21, 2020 (12 pages).
Chinese-language Office Action issued in Chinese Application No. 202080025230.7 dated Jul. 11, 2022 (seven (7) pages).
Japanese-language Office Action issued in Japanese Application No. 2021-557501 dated Apr. 2, 2024 with English translation (7 pages).

* cited by examiner

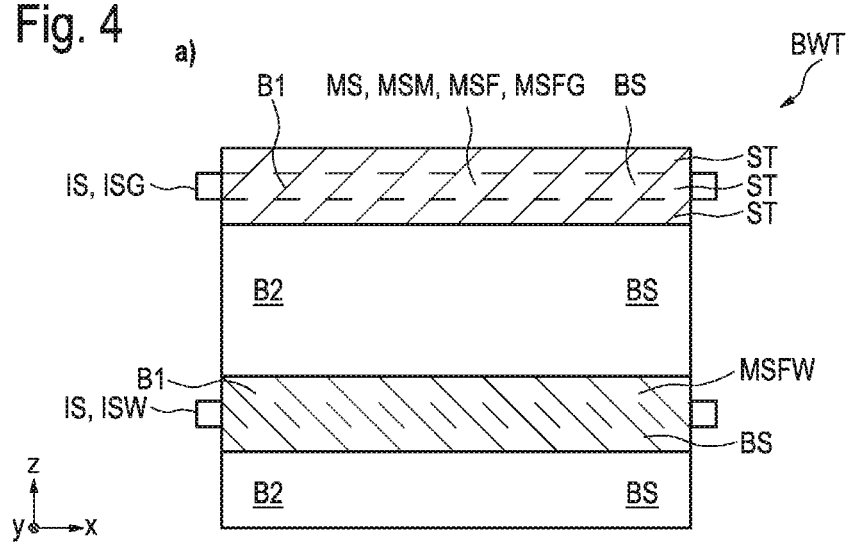

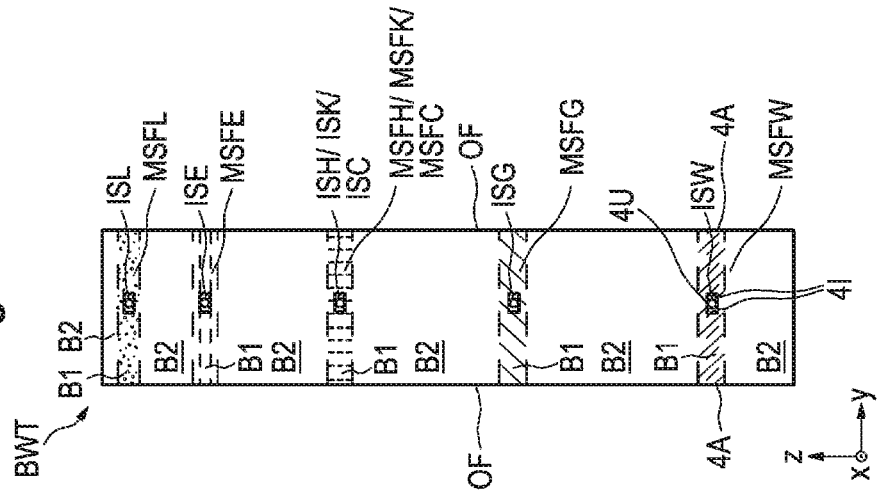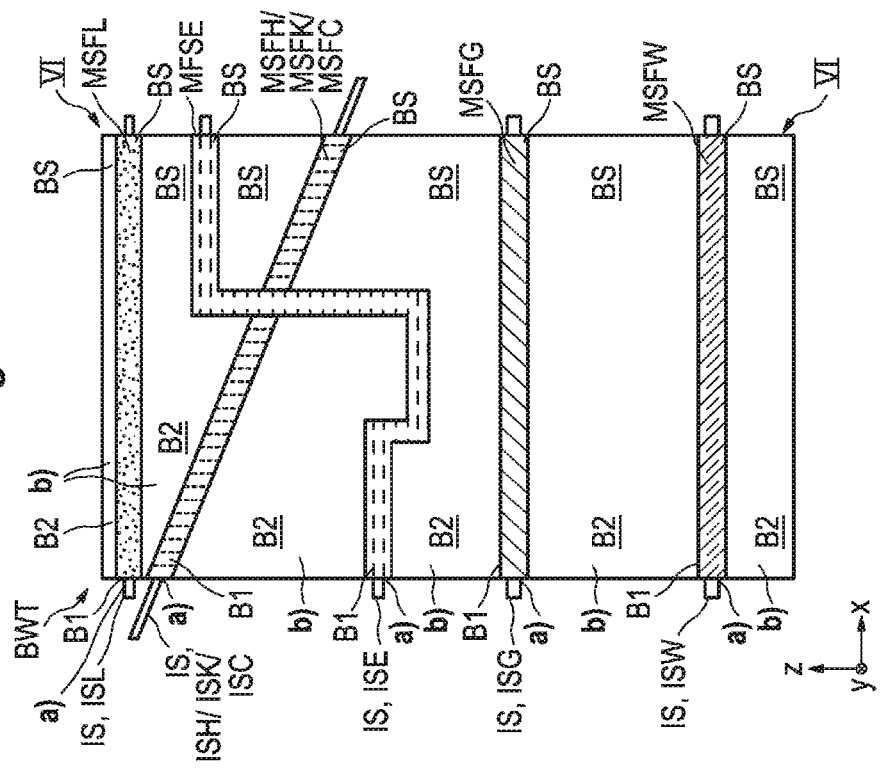

METHOD FOR PRODUCING A BUILDING COMPONENT, SYSTEM FOR PRODUCING A BUILDING COMPONENT AND BUILDING COMPONENT

FIELD OF APPLICATION AND PRIOR ART

The invention relates to a method for producing a part of a building, a system for producing a part of a building, and a part of a building.

PROBLEM AND SOLUTION

The problem addressed by the invention is to provide a method for producing a part of a building, a system for producing a part of a building, and a part of a building which, in particular in each case, has improved properties.

The invention solves this problem by providing a method, a system, and a part of a building, having the features of the independent claims. Advantageous refinements and/or configurations of the invention are described in the dependent claims.

The method, in particular automatic method, according to the invention is designed or configured or intended for producing a part of a building, in particular a 3-dimensional part of a building. The part of a building has at least one first region, in particular continuous first region, and one second region, in particular continuous second region, which is adjacent to or adjoins the first region, in particular directly, in particular after the production. In the first region, an installation structure or equipment structure is concealed by building material, in particular after the production. The method comprises the following steps: a) dispensing or discharging building material, in particular automatically, to produce the one region and providing the building material, in particular automatically and/or locally, with a marking or detection substance before, at the same time as and/or after, in particular either before or at the same time as or after, the dispensing operation; b) dispensing or discharging building material, in particular automatically, to produce the other region, in particular before, at the same time as and/or after, in particular either before or at the same time as or after, step a).

In particular, the part of a building may be a structural part of a building and/or a wall and/or a ceiling.

The first region may be referred to as the first zone and/or the second region may be referred to as the second zone. Additionally or alternatively, the second region may be different from the first region. In particular, in the second region it is possible that no installation structure is concealed by building material, or no installation structure needs to be concealed by building material. Further additionally or alternatively, the first region and the second region may be different, in particular may be or have been arranged, along and/or parallel to a surface of the building material and/or of the part of a building, in particular the next surface, in particular at different positions or locations.

The installation structure may be different from a building material. Additionally or alternatively, the building material may be concrete, in particular fresh concrete, and/or thixotropic. Further additionally or alternatively, the building material may have a maximum grain size of a minimum of 4 millimeters (mm), in particular of a minimum of 10 mm, in particular of a minimum of 16 mm.

"Concealed" may be referred to as hidden, and/or mean that the installation structure is arranged behind building material, in particular horizontally, and/or underneath building material, in particular vertically. In particular, the installation structure may be enclosed by building material. It is therefore possible for the installation structure to not be visible, in particular readily, at least on one side of the part of a building.

Particularly preferably, the first region may be the one region and the second region may be the other region. Alternatively, the first region may be the other region and the second region may be the one region.

It is possible for the building material for producing the other region to not be provided or have been provided with a marking substance, or the building material for producing the other region does not need to be provided and/or have been provided with a marking substance.

The marking substance may be different from the building material, in particular concrete accelerator, and/or the installation structure, in particular before the provision. Additionally or alternatively, step a) may comprise: introducing the marking substance into the building material. Further additionally or alternatively, the marking substance may be designed to change the properties, in particular physical properties, of the building material, in particular locally, in particular compared to the situation without a marking substance.

This, in particular the marking substance, makes it possible to localize or detect, in particular relatively precisely, the one region/installation structure, which in particular cannot be recognized or perceived without a marking substance. This can therefore make it possible to avoid damage, in particular unintended damage, to the installation structure, in particular during processing, in particular when introducing fastenings and cable ducts, of the part of a building, in particular of the first region. Additionally or alternatively, this can make it possible for less time to be taken on or even to completely avoid a previous localization, for example based on usually relatively imprecisely documented and/or usually relatively imprecisely implemented building plans, of the first region/of the installation structure. Consequently, the method has improved properties.

In one refinement of the invention, the marking substance, in particular in the first region, is arranged spatially closer to a surface, in particular at least one surface, in particular the and/or next surface, of the building material and/or of the part of a building than the installation structure is, in particular in a direction which is orthogonal in relation to the surface. When processing the part of a building, in particular the first region, this makes it possible to perceive the marking substance before the installation structure, in particular damage to the installation structure. In particular, the marking substance may be arranged, in particular partially, on the surface. This can make it possible to perceive the one region, in particular the first region, in particular the marking substance, from the outside.

In particular, the marking substance may be designed to change a structure, in particular locally, or to create, in particular locally, a changed structure of a surface, in particular the surface, of the building material and/or of the part of a building, in particular a concrete retarder.

In one refinement of the invention, the marking substance is a ferromagnetic material and/or a color, in particular a dye. This, in particular the ferromagnetic material, enables magnetic detection or identification. Additionally or alternatively, this, in particular the color, enables optical detection or identification, in particular in an unfinished state of the part of a building, in particular of the one region, readily and/or in a dismantled state of the part of a building, in particular of the one region, for example by means of drilling dust. In particular, the ferromagnetic material may comprise or be metal flakes. Additionally or alternatively, the color may be different, such as for example blue, purple, yellow, green or red, from a color, in particular a natural color, of the building material, in particular compared to the situation without a marker substance, such as for example gray or white. Further additionally or alternatively, the building material may be colored through by the marking substance, in particular the color, in particular in the one region and/or locally. Further additionally or alternatively, the building material, in particular in the first region, may be provided or have been provided with the color in such a way that the building material and/or the part of a building, in particular its surface, may have a color gradient, in particular of increasing intensity, in the direction toward the installation structure, in particular a direction which is orthogonal and/or radial in relation to the installation structure, in particular along and/or parallel to the surface. This can make it possible to indicate a distance from the installation structure. Further additionally or alternatively, the color may have a proportion by mass of a minimum of 0.2 percent (%), in particular of a minimum of 2%, and/or a maximum of 20%, in particular 10%, of the weight of the building material, in particular the weight of cement.

In one configuration of the invention, the installation structure is out of a set of different types or kinds of installation. Different colors are assigned to the different types of installation. This enables the type of installation to be clearly indicated and/or identified.

In particular, the installation structure may comprise or be a shaft for an installation and/or a line, in particular a pipe, a hose and/or a cable.

In one refinement of the invention, the installation structure is a gas installation, a water installation, a heating installation, a cooling installation, an acclimate installation, a ventilation installation and/or an electrical installation.

In one refinement of the invention, in particular preferably, either step a) or step b) comprises: introducing the installation structure into the building material, in particular automatically. This makes it possible to produce the part of a building in a shorter time.

In particular, the method may comprise a prefabrication process, wherein the prefabrication process may comprise at least the dispensing of building material, in particular the building material.

In one refinement of the invention, the method comprises an in particular automatic 3D printing process, in particular extrusion process, in particular is a 3D printing process. The 3D printing process comprises at least the dispensing of building material, in particular the building material. In particular, the 3D printing process may be referred to as an additive manufacturing method. Additionally or alternatively, the 3D printing process, in particular extrusion process, may comprise the dispensing, in particular extruding, of at least one strand of building material, in particular the building material. In particular, the strand, in particular the dispensed strand, may be continuous or extend along a length, in particular a certain length. Additionally or alternatively, the strand, in particular a width of the strand, may comprise the thickness, in particular the entire thickness, of the wall and/or ceiling. Further additionally or alternatively, the strand, in particular a cross section of the strand, may be dispensed with an interruption. This, in particular the interruption, may form the shaft and/or the installation structure. Further additionally or alternatively, the strand may be deposited or dispensed, in particular in layers, on or onto an already printed or dispensed strand, and/or a further strand may be deposited or discharged, in particular in layers, on or onto the strand. Further additionally or alternatively, the building material may be firm or dimensionally stable, in particular at the same time as the dispensing operation. Further additionally or alternatively, the 3D printing process may comprise providing building material, in particular the building material, with a marking substance, in particular the marking substance.

In one refinement of the invention, step a) comprises: admixing, in particular injecting, marking substance, in particular the marking substance, into the building material, in particular automatically, before the dispensing operation, and dispensing building material, in particular the building material, with the admixed, in particular injected, marking substance. This enables a relatively good mixing, in particular color penetration, of the building material with the marking substance, in particular the color. In particular, it is possible for injecting to be performed at a pressure greater than 10 bar, in particular greater than 100 bar. This, in particular the high pressure, can make it possible to distribute the marking substance broadly enough that no further mixing unit is required.

The system according to the invention is designed or configured for the production, in particular automatic production, of a part of a building, in particular the part of a building. The part of a building has at least one first region, in particular the and/or continuous first region, and one second region, in particular the and/or continuous second region, which adjoins the first region, in particular after the production. In the first region, an installation structure, in particular the installation structure, is concealed by building material, in particular the building material, in particular after the production. The system comprises a controllable dispensing or discharging device, in particular an electrically controllable dispensing or discharging device, a controllable marking device, in particular an electrically controllable marking device, and a control device, in particular an electric control device, in particular a computer. The controllable dispensing device is designed or configured to dispense or discharge building material, in particular the building material, in particular automatically. The controllable marking device is designed or configured to provide the building material, in particular automatically and/or locally, with a marking substance, in particular the marking substance, before, at the same time as and/or after, in particular either before or at the same time as or after, the dispensing operation. The control device is designed or configured to control the dispensing device and the marking device, in particular automatically and/or independently, in such a way that a step a), in particular the step a), comprises dispensing building material, in particular the building material, to produce the one region by means of the dispensing device, and providing the building material with a marking substance, in particular the marking substance, before, at the same time as and/or after, in particular either before or at the same time as or after, the dispensing operation by means of the marking device, and a step b), in particular the step b), comprises dispensing building material, in particular the building material, to produce the other region by means of the dispensing device, in particular before, at the same time as and/or after, in particular either before or at the same time as or after, step a).

The system can allow the same advantage(s) as the method described above.

In particular, the system may be designed or configured for carrying out or performing the method described above, in particular automatically. Additionally or alternatively, the marking device may be different from the dispensing device.

In one refinement of the invention, the system comprises a controllable introducing device, in particular an electrically controllable introducing device. The introducing device is designed or configured to introduce the installation structure into the building material, in particular automatically. The control device is designed or configured to control the introducing device, in particular automatically and/or independently, in such a way that either step a) or step b) comprises introducing the installation structure into the building material.

In one refinement of the invention, the system comprises a controllable, common movement device, in particular an electrically controllable, common movement device, in particular a controllable, common movement arm, in particular an electrically controllable, common movement arm. The common movement device is designed or configured for the in particular automatic, common, in particular at least translational, movement of the dispensing device and the marking device, in particular at the same time as the dispensing operation and the provision. The control device is designed or configured to control the common movement device, in particular automatically and/or independently. In other words: it is possible for the dispensing device and the marking device to not be movable independently of one another, or the dispensing device and the marking device do not need to be movable independently of one another. In particular, the common movement device may be referred to as a common positioning device and/or the common movement arm may be referred to as a common robot arm and/or a common mast. Additionally or alternatively, the common movement device, in particular the common movement arm, and/or the dispensing device and/or the marking device may be designed for the rotational movement, in particular the common rotational movement, of the dispensing device and the marking device, in particular at the same time as the dispensing operation and the provision.

In one refinement, the system comprises a 3D printing system, in particular an extrusion system, in particular is a 3D printing system. The 3D printing system comprises at least the dispensing device. In particular, the 3D printing system may comprise the marking device.

In one refinement of the invention, the marking device, in particular comprising at least one injection nozzle, in particular controllable injection nozzle, is designed or configured to admix, in particular inject, marking substance, in particular the marking substance, into the building material, in particular automatically, before the dispensing operation. The dispensing device is designed or configured to dispense building material, in particular the building material, with the admixed, in particular injected, marking substance.

In one refinement of the invention, the system comprises a controllable building-material pump, in particular an electrically controllable building-material pump. The building-material pump is designed or configured to convey building material, in particular the building material, out of the dispensing device, in particular automatically. The control device is designed or configured to control the building-material pump, in particular automatically and/or independently. In particular, the system may comprise a building-material conveying line, wherein the building-material conveying line can connect the building-material pump to the dispensing device for a stream or a flow of building material from the building-material pump through the building-material conveying line to the dispensing device. Additionally or alternatively, the building-material pump may be discontinuous, in particular a piston pump, in particular a two-piston pump, in particular having a pipe switch.

In one refinement of the invention, the control device is designed or configured to control the dispensing device, the marking device, the introducing device, the common movement device and/or the building-material pump, in particular automatically and/or independently, as a function of data, in particular a building plan or construction plan, in particular in a memory of the control device, of the part of a building that is to be produced. This obviates the need for a worker to control the system and/or makes it possible to reduce or even avoid errors during the construction.

The part of a building according to the invention has at least one first region, in particular the and/or continuous first region, and one second region, in particular the and/or continuous second region, which adjoins the first region. In the first region, an installation structure, in particular the installation structure, is concealed by building material, in particular the building material. The one region comprises dispensed building material, in particular the dispensed building material, which is provided with a marking substance, in particular the marking substance and/or (the) introduced and/or admixed, in particular injected, marking substance. The other region comprises dispensed building material, in particular the dispensed building material.

The part of a building can allow the same advantage(s) as the method previously described and/or the system previously described.

In particular, the part of a building may be produced, in particular directly, by means of the method described above and/or the system described above. Additionally or alternatively, the part of a building may be designed or configured partially or completely as described above for the method and/or the system.

BRIEF DESCRIPTION OF THE DRAWINGS

Further advantages and aspects of the invention emerge from the claims and from the following description of preferred exemplary embodiments of the invention, which are explained below with reference to the figures.

FIG. 4 schematically shows a further step a) of the method according to the invention for producing the part of a building according to the invention in a side view.

FIG. 5 schematically shows further steps a) and b) of the method according to the invention for producing the part of a building according to the invention in a side view.

FIG. 6 schematically shows the part of a building according to the invention of FIG. 5 in a cross-sectional view.

DETAILED DESCRIPTION OF THE EXEMPLARY EMBODIMENTS

Figure 1:
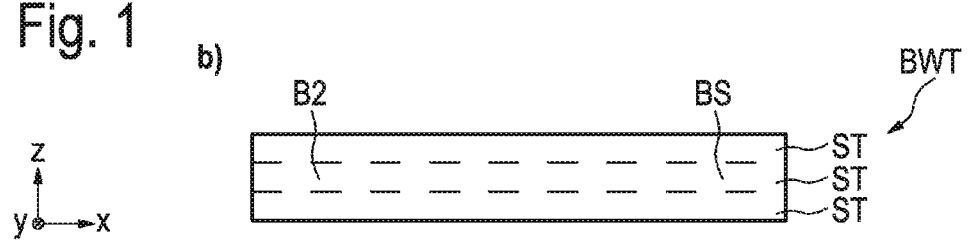
FIG. 1 schematically shows a step b) of a method according to the invention for producing a part of a building according to the invention in a side view.

FIGS. 1 to 6 show a method for producing a part of a building BWT. The part of a building BWT has at least one first region B1 and one second region B2, which adjoins the first region, in particular after the production. In the first region B1, an installation structure IS is concealed by building material BS, in particular after the production. The method comprises the following steps: a) dispensing building material BS to produce the one region B1, in the exemplary embodiment shown the first region B1, and providing the building material BS with a marking substance MS, in the exemplary embodiment shown before the dispensing operation; b) dispensing building material to produce the other region B2, in the embodiment shown the second region B2.

FIGS. 7 to 11 show a system 20 for producing the part of a building BWT. The system 20 comprises a controllable dispensing device 1, a controllable marking device 51 and a control device 24. The controllable dispensing device 1 is designed to dispense building material BS. The controllable marking device 51 is designed to provide the building material BS with marking material MS, in the exemplary embodiment shown before the dispensing operation. The control device 24 is designed to control the dispensing device 1 and the marking device 51, in particular automatically, in such a way, in particular controls in such a way, that the step a) comprises dispensing building material BS to produce the one region B1 by means of the dispensing device 1 and providing the building material BS with a marking substance MS, in the exemplary embodiment shown before the dispensing operation, by means of the marking device 51, and step b) comprises dispensing building material BS to produce the other region B2 by means of the dispensing device 1.

In particular, the system 20 is designed to carry out, in particular carries out, the method described above.

FIGS. 5 and 6 show the part of a building BWT, which is produced in particular by means of the method and/or the system 20. The part of a building BWT has at least the first region B1 and the second region B2, which adjoins the first region. In the first region B1, the installation structure IS is concealed by building material BS. The one region B1, in the exemplary embodiment shown the first region B1, comprises dispensed building material BS, which is provided with a marking substance MS. The other region B2, in the embodiment shown the second region B2, comprises dispensed building material BS.

In detail, the marking substance MS is arranged spatially closer to a surface OF of the building material BS and/or of the part of a building BWT than the installation structure IS is, in particular in a direction y which is orthogonal in relation to the surface OF.

In the exemplary embodiment shown, the marking substance is arranged, in particular partially, on the surface OF.

Furthermore, in the exemplary embodiment shown, the marking substance MS is a ferromagnetic material MSM and a color MSF. In alternative exemplary embodiments, the marking substance may be, in particular either, a ferromagnetic material or a color.

In the exemplary embodiment shown, the building material BS is penetrated with color by the marking substance MS, in particular the color MSF, in particular in the one region B1.

In detail, the installation structure IS is out of a set of different types of installation ISG, ISW, ISH/ISK/ISC, ISL, ISE. The different types of installation ISG, ISW, ISH/ISK/ISC, ISL, ISE are assigned different colors MSFG, MSFW, MSFH/MSFK/MSFC, MSFL, MSFE.

In addition, the installation structure IS is a gas installation ISG, a water installation ISW, a heating, cooling and/or acclimate installation ISH/ISK/ISC, a ventilation installation ISL and/or an electrical installation ISE.

Furthermore, in the exemplary embodiment shown, step a) comprises: introducing the installation structure IS into the building material BS.

Figure 10:
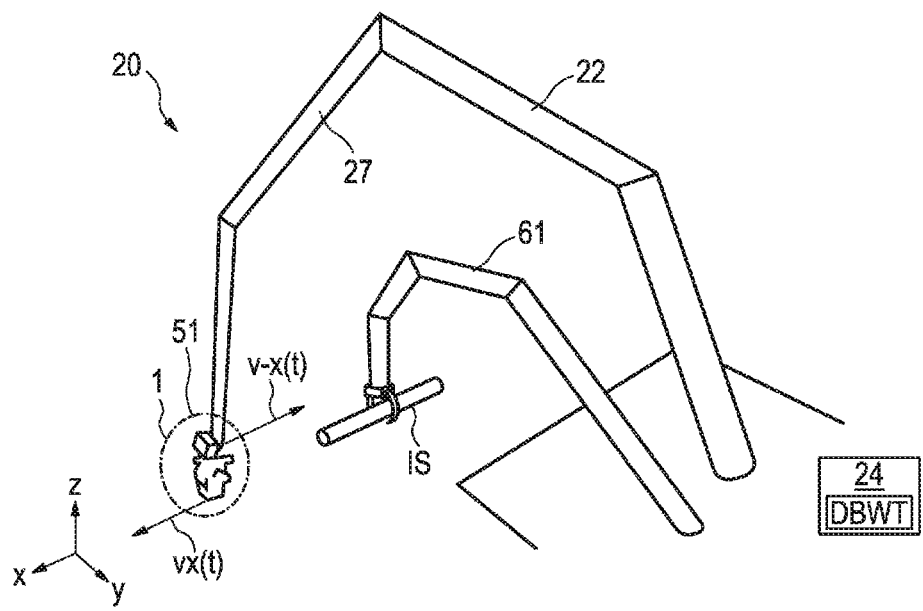
FIG. 10 shows a perspective view of the system of FIG. 7, an introducing device and a common movement device.

Moreover, the system 20 comprises a controllable introducing device 61, as shown in FIG. 10. The introducing device 61 is designed to introduce the installation structure IS into the building material BS. The control device 24 is designed to control the introducing device 61 in such a way, in particular controls the introducing device in such a way, that, in the exemplary embodiment shown, step a) comprises introducing the installation structure IS into the building material BS.

In the exemplary embodiment shown, the introducing device 61 comprises a controllable arm, in particular an electrically controllable arm, and/or a controllable hand, in particular an electrically controllable hand.

Furthermore, the system 20 has a controllable, common movement device 22, in particular a controllable, common movement arm, as shown in FIG. 10. The common movement device 22 is designed for the common, in particular at least translational, movement of the dispensing device 1 and the marking device 51, in particular at the same time as the dispensing operation and the provision, in particular commonly moves said dispensing device and marking device. The control device 24 is designed to control, in particular controls, the common movement device 22, in particular automatically.

In the exemplary embodiment shown, the common movement device 22 and/or the dispensing device 1 and/or the marking device 51 are/is additionally designed for the rotational movement, in particular common rotational movement, of the dispensing device 1 and the marking device 51, in particular at the same time as the dispensing operation and the provision, in particular rotate/rotates said dispensing device and marking device.

In detail, the common movement device 22 is designed for the common movement of the dispensing device 1 and the marking device 51 in a direction of movement −x, in particular a horizontal direction of movement. The dispensing device 1 is designed to dispense building material BS in a dispensing direction x that is non-orthogonal, in particular reversed, in particular opposite, in relation to the direction of movement −x, in particular at the same time as the common movement.

Additionally or alternatively, the system 20, in particular the dispensing device 1, is designed to dispense building material BS at a dispensing speed vx that can be set, in particular variably, in particular continuously. The common movement device 22 is designed for the common movement of the dispensing device 1 and the marking device 51 at a movement speed v−x which is equal, in particular approximately equal, to the dispensing speed vx, in particular at the same time as the dispensing operation.

In addition, the method comprises a 3D printing process, in particular an extrusion process. The 3D printing process comprises at least the dispensing of building material BS.

In the exemplary embodiment shown, the 3D printing process additionally comprises the providing of building material BS with a marking substance MS.

Figure 7:
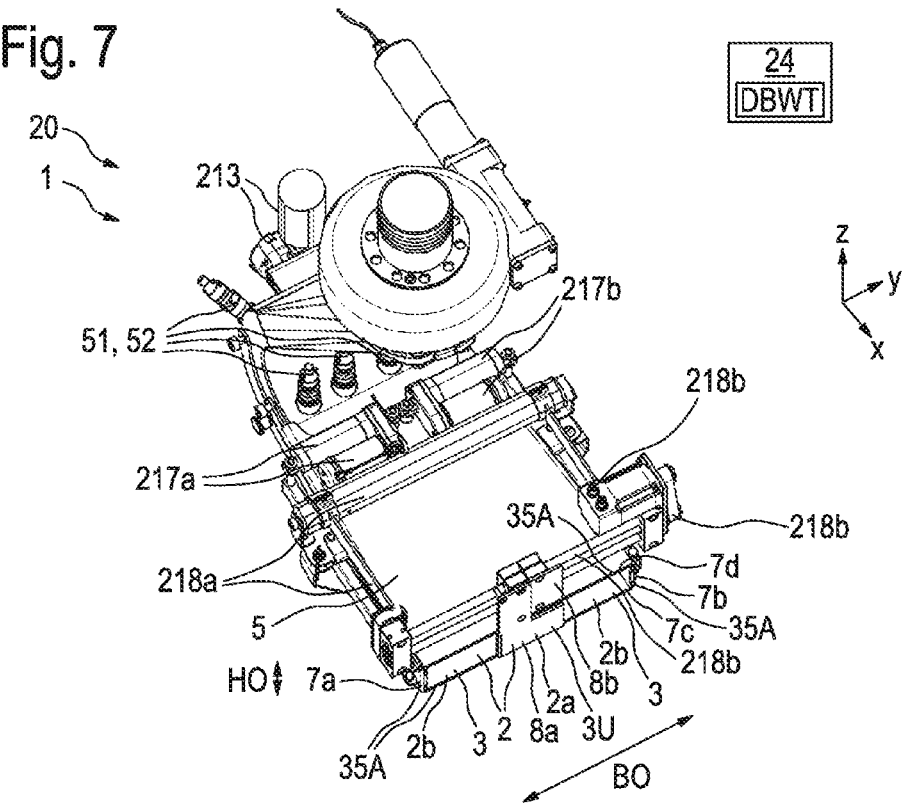
FIG. 7 shows a perspective view of a system according to the invention for producing the part of a building according to the invention.
Figure 8:
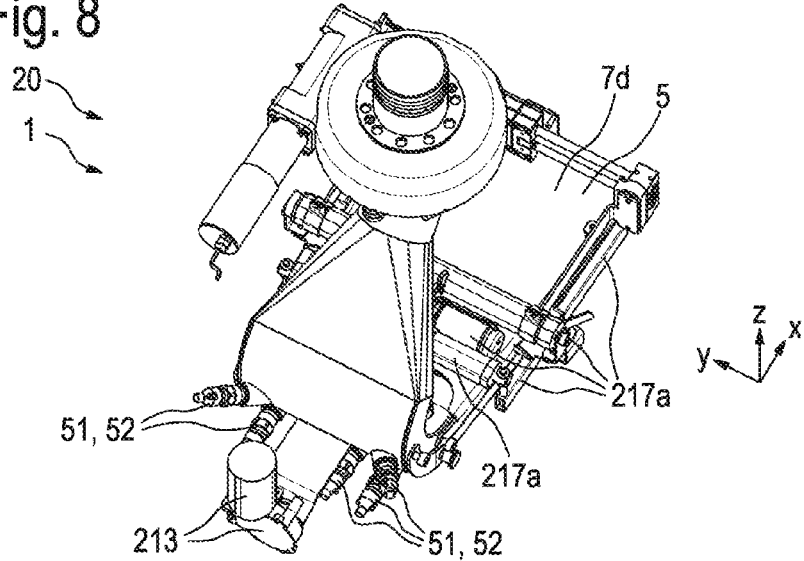
FIG. 8 shows a further perspective view of the system of FIG. 7.
Figure 9:
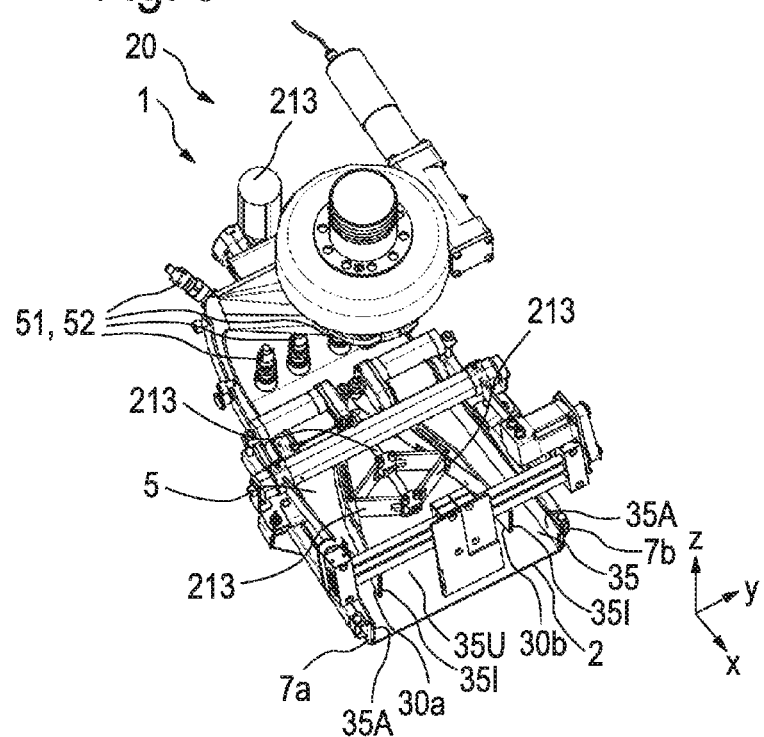
FIG. 9 shows yet another perspective view of the system of FIG. 7 without an upper peripheral wall.

The system 20 also comprises a 3D printing system, in particular extrusion system, in particular is a 3D printing system, as shown in FIGS. 7 to 9. The system or 3D printing system 20 comprises at least the dispensing device 1.

In the exemplary embodiment shown, the system or 3D printing system 20 additionally comprises the marking device 51.

In detail, the dispensing device 1 is a printing device and/or extrusion device for extruding a strand ST of building material BS for 3D printing the part of a building BWT. The dispensing device or extrusion device 1 has an extruder nozzle 5. The extruder nozzle 5 has a dispensing opening 2, in particular a rectangular dispensing opening, for dispensing the strand ST of building material BS out of the extrusion device 1 in the dispensing direction x, which is in particular almost horizontal.

In particular, the extruder nozzle 5, in particular the dispensing opening 2, is tubular and/or closed at the periphery, in particular by at least one circumferential wall 7a, 7b, 7c, 7d, in particular in/counter to a first peripheral direction y, which is in particular orthogonal in relation to the dispensing direction x, and/or a second peripheral direction z, which is in particular orthogonal in relation to the dispensing direction x. Additionally or alternatively, the dispensing opening 2 has an opening width BO, in particular a maximum opening width, of a minimum of 100 mm, in particular a minimum of 200 mm, and/or a maximum of 800 mm, in particular a maximum of 600 mm, in the exemplary embodiment shown 400 mm, in particular in the first peripheral direction y. Further additionally or alternatively, the dispensing opening 2 has an opening height HO, in particular a maximum opening height, of a minimum of 15 mm, in particular a minimum of 25 mm, and/or a maximum of 400 mm, in particular a maximum of 200 mm, in particular a maximum of 100 mm, in the exemplary embodiment shown 50 mm, in particular in the second peripheral direction z.

In the exemplary embodiment shown, the system or 3D printing system 20, in particular the dispensing device or extrusion device 1, additionally comprises at least one specification element, in particular shape specification element, 7a, 7b, 8a, 8b, 30a, 30b and at least one controllable, in particular electrically controllable, in particular electric setting device 213, 217a, 217b, 218a, 218b. The at least one specification element 7a, 7b, 8a, 8b, 30a, 30b has a variable, in particular continuously variable, settable, in particular movably settable, design for the variable, in particular continuously variable, settable specification, in particular shape specification, of at least a part 4A, 4I, in particular edge, of a strand cross section 4, in particular rectangular strand cross section, in particular a surface area of the strand cross section, of the strand ST of building material BS, in particular at the same time as the dispensing operation, in particular in/counter to the first peripheral direction y and/or the second peripheral direction z, in particular into at least two different settings. The at least one setting device 213, 217a, 217b, 218a, 218b is designed for the in particular variable setting, which is in particular automatic and/or continuous, of the at least one specification element 7a, 7b, 8a, 8b, 30a, 30b.

In detail, the extruder nozzle 5 comprises several peripheral walls 7a, 7b, 7c, 7d. The peripheral walls 7a, 7b, 7c, 7d peripherally define or delimit the dispensing opening 2. The at least one specification element comprises at least one of the peripheral walls 7a, 7b. The at least one peripheral wall 7a, 7b has a variably settable design for the variably settable definition and/or delimitation of an outer edge or outer part 35A of a flow cross section 35, in particular a shaping and/or rectangular flow cross section, of building material BS within the extruder nozzle 5 for the purpose of variably adjustably specifying an outer edge or outer part 4A of the strand cross section 4.

The at least one specification element further comprises at least one inner element 30a, 30b. The at least one inner element 30a, 30b has a variably settable design, in particular can be moved relative to the extruder nozzle 5, for variably settable, in particular complete, arrangement, within the extruder nozzle 5 for the purpose of variably settable definition or delimitation of an inner edge or inner part 35I, in particular of at least one inner edge or inner part, of the flow cross section 35 of building material BS within the extruder nozzle 5 for the purpose of variably adjustable specification of an inner edge or inner part 4I, in particular at least one inner edge or inner part, of the strand cross section 4.

In particular, in a setting shown in FIG. 9, the at least one inner element 30a, 30b provides a division into two parts by means of an interruption 35U, 4U, in particular a rectangular interruption, in particular in a direction which is in particular horizontal, in particular in the first peripheral direction y, in particular of the flow cross section 35, and thus of the strand cross section 4, as shown in FIG. 6.

In addition, the at least one specification element comprises at least one cover element 8a, 8b, in particular rectangular cover element. The at least one cover element 8a, 8b has a variably settable design, in particular can be moved relative to the dispensing opening 2 or the extruder nozzle 5, for the variably settable covering of at least one part 2a of the dispensing opening 2 for the variably adjustable specification of at least one part or edge 4A, 4I, in particular the outer edge 4A and/or the inner edge 4I, of the strand cross section 4 by at least one uncovered part 2b of the dispensing opening 2, in particular an opening cross section 3 of the dispensing opening 2.

In particular, in a setting shown in FIGS. 7 and 8, the at least one cover element 8a, 8b covers the part 2a, in particular inner and/or rectangular part, of the dispensing opening 2 in such a way that the opening cross section 3 is in particular rectangular and is divided in two parts by means of an interruption 3U, in particular a rectangular interruption, in particular in a direction which is in particular horizontal, in particular in the first peripheral direction y. Consequently, the opening cross section 3 divided in two parts, in particular rectangular opening cross section divided in two parts, having the interruption 3U, in particular rectangular interruption, thus specifies the strand cross section 4 divided in two parts, in particular rectangular strand cross section divided in two parts, having an interruption 4U, in particular rectangular interruption, of the strand ST, in particular dispensed strand, of building material BS, as shown in FIG. 6.

Furthermore, the at least one cover element 8, 8a, 8b has a variably settable design for severing, in particular for cutting off, the strand ST, in particular dispensed strand, of building material BS from the dispensing device or extrusion device 1, in particular from the extruder nozzle 5, in particular at the dispensing opening 2.

Moreover, the system or 3D printing system or extrusion system 20, in particular the dispensing device or extrusion device 1, is designed for depositing the strand ST, in particular dispensed strand, in such a way that the strand ST, in particular deposited strand, maintains its strand cross section 4, in particular of the dispensed strand ST. In other words: the system or 3D printing system or extrusion system, in particular the dispensing device or extrusion device, does not need to be designed, or it is possible not to design it, in such a way that the building material needs to or can be pressed onto an already existing building-material layer and thus deformed.

Furthermore, the strand ST may be deposited, in particular in layers, on an already dispensed or printed or extruded strand ST and/or a further strand ST may be deposited on the strand ST, in particular in layers, as shown in FIGS. 1 to 6.

In addition, step a) comprises: admixing, in particular injecting, a marking substance MS into the building material BS before the dispensing operation, and dispensing building material BS with the admixed marking substance MS, in particular injected marking substance.

The marking device 51, in particular having at least one injection nozzle 52, in particular controllable injection nozzle, in the exemplary embodiment shown ten injection nozzles 52, is also designed to admix, in particular inject, a marking substance MS into the building material BS before the dispensing operation. The dispensing device or extrusion device 1 is designed to dispense building material BS with the admixed marking substance MS, in particular injected marking substance.

In the exemplary embodiment shown, the at least one injection nozzle 52 is at least one clocked high-pressure nozzle with a pressure of greater than 10 bar, in particular greater than 100 bar. Additionally or alternatively, the marking device 51, in particular the at least one injection nozzle 52, is arranged in the second peripheral direction z above the extruder nozzle 5 or the peripheral wall 7d and/or counter to the dispensing direction −x downstream of the extruder nozzle 5. In particular, the marking device 51, in particular the at least one injection nozzle 52, is arranged a maximum of 1000 mm, in particular a maximum of 800 mm, in particular a maximum of 600 mm, and/or a minimum of 100 mm, in particular a minimum of 200 mm, in particular a minimum of 400 mm, upstream of the dispensing opening 2. This, in particular the arrangement, makes it possible to have as little building material provided with a marking substance as possible in the dispensing device or extrusion device 1.

Figure 11:
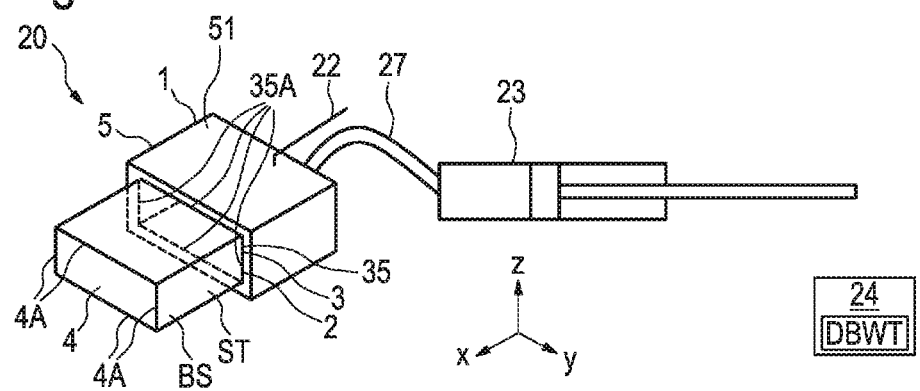
FIG. 11 shows a perspective view of the system of FIG. 7 and a building-material pump.

Moreover, the system 20 has a controllable building-material pump 23, as shown in FIG. 11. The building-material pump 23 is designed to convey building material BS out of the dispensing device 1. The control device 24 is designed to control the building-material pump 23, in particular automatically.

In the exemplary embodiment shown, the building-material pump 23 is discontinuous, in particular a piston pump. Additionally or alternatively, the system 20 has a building-material conveying line 27, wherein the building-material conveying line 27 connects the building-material pump 23 to the dispensing device 1 for a stream of building material BS from the building-material pump 23 through the building-material conveying line 27 to the dispensing device 1.

Furthermore, the control device 24 is designed to control the dispensing device 1, in particular the at least one setting device 213, 217a, 217b, 218a, 218b, the marking device 51, in particular the at least one injection nozzle 52, the introducing device 61, the common movement device 22 and/or the building-material pump 23, in particular automatically, as a function of data DBWT of the part of a building BWT that is to be produced.

In the exemplary embodiment shown, the part of a building BWT, in particular the part of a building that is produced, has five first regions B1, as shown in FIGS. 1 to 6. In alternative exemplary embodiments, the part of a building may have only a single first region or two, three, four or at least six first regions. In addition, in the exemplary embodiment shown, the part of a building BWT, in particular the part of a building that is produced, has six second regions B2. In alternative exemplary embodiments, the part of a building may have only a single second region or two, three, four, five or at least seven second regions.

In detail, at the beginning, in particular in terms of time, of the production of the part of a building BWT, in step b) building material BS is dispensed to produce the other region B2, in particular the second region, as shown in FIG. 1.

Figure 2:
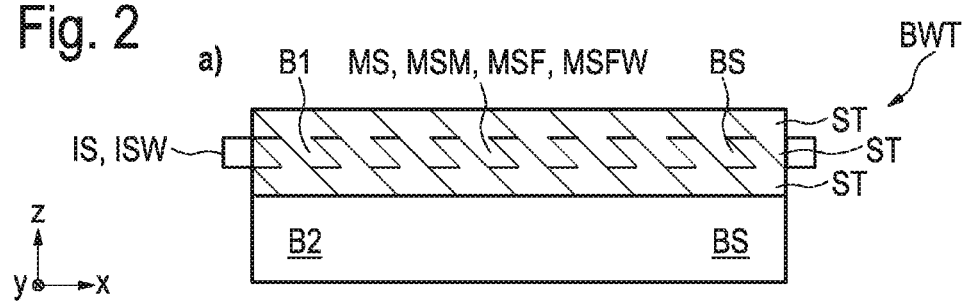
FIG. 2 schematically shows a step a) of the method according to the invention for producing the part of a building according to the invention in a side view.

After this, in step a), building material BS is dispensed to produce the one region B1, in particular the first region, the building material BS is provided with a marking substance MS and the installation structure IS is introduced into the building material BS, as shown in FIG. 2. In particular, the installation structure IS is a water installation ISW and the water installation ISW is assigned the color MFSW, in particular blue, shown shaded from top left to bottom right in FIGS. 2 to 6. Additionally or alternatively, the building material BS, in particular in the first region B1, is or has been provided with the color MFSW in such a way that the building material BS and/or the part of a building BWT, in particular its surface OF, has a color gradient, in particular of increasing intensity, in a vertical direction z of the installation structure ISW, shown in FIGS. 2 to 6 by way of weaker and stronger shading.

Figure 3:
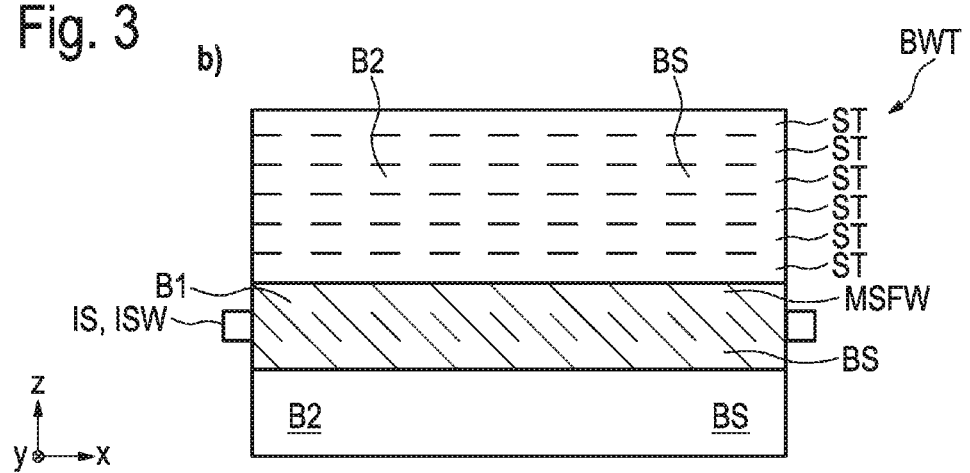
FIG. 3 schematically shows a further step b) of the method according to the invention for producing the part of a building according to the invention in a side view.

Subsequently, in step b), building material BS is dispensed to produce the other region B2, in particular the second region, as shown in FIG. 3.

After this, in step a), building material BS is dispensed to produce the one region B1, in particular the first region, the building material BS is provided with a marking substance MS and the installation structure IS is introduced into the building material BS, as shown in FIG. 4. In particular, the installation structure IS is a gas installation ISG and the gas installation ISG is assigned the color MFSG, in particular yellow, shown shaded from top right to bottom left in FIGS. 4 to 6.

After this, in steps b), building material BS is dispensed to produce the other regions B2, in particular the second regions, and in steps a) building material BS is dispensed to produce the one region B1, in particular the first region, the building material BS is provided with a marking substance MS and the installation structures IS are introduced into the building material BS, as shown in FIGS. 5 and 6.

In particular, the installation structures IS are an electrical installation ISE, a heating, cooling and/or acclimate installation ISH/ISK/ISC and/or a ventilation installation ISL. The electrical installation ISE is assigned the color MFSE, in particular purple, shown shaded from right to left in FIGS. 5 and 6. The heating, cooling and/or acclimate installation ISH/ISK/ISC is assigned the color MFSH/MSFK/MSFC, in particular red, shown shaded from top to bottom in FIGS. 5 and 6. Additionally or alternatively, the building material BS, in particular in the first region B1, is or has been provided with the color MFSH/MSFK/MSFC in such a way that the building material BS and/or the part of a building BWT, in particular its surface OF, has a color gradient, in particular of increasing intensity, in the vertical and horizontal directions z, y of the installation structure ISH/ISK/ISC, shown in FIGS. 5 and 6 by weaker and stronger shading. The ventilation installation ISL is assigned the color MFSL, in particular green, shown in dotted shading in FIGS. 5 and 6.

As is made clear by the exemplary embodiments shown and explained above, the invention provides an advantageous method for producing a part of a building, an advantageous system for producing a part of a building, and an advantageous part of a building which, in particular in each case, has improved properties.

The invention claimed is:

1. A method for producing a part of a building, wherein the part of a building has at least one first region and one second region, which adjoins the first region, wherein, in the first region, an installation structure is concealed by building material, the method comprising the steps of:
   a) dispensing building material to produce the first region of the part of the building in which the installation structure is concealed by the building material, and providing the building material with a marking substance admixed into the building material before the dispensing operation, wherein the marking substance is a color and the building material is concrete; and
   b) dispensing building material to produce the second region,
   wherein the installation structure is from a set of different types of installations, wherein the different types of installations are assigned different colors,
   wherein the marking substance is different from the installation structure and the installation structure is different from the building material.

2. The method as claimed in claim 1, wherein the marking substance is arranged spatially closer to a surface of the building material and/or of the part of a building than that of the installation structure.

3. The method as claimed in claim 1, wherein the marking substance is a ferromagnetic substance.

4. The method as claimed in claim 1, wherein the installation structure is a gas installation, a water installation, a heating installation, a cooling installation, an acclimate installation, a ventilation installation and/or an electrical installation.

5. The method as claimed in claim 1, wherein step a) comprises:
   introducing the installation structure into the building material.

6. The method as claimed in claim 1, wherein the method comprises a 3D printing process, and wherein the 3D printing process comprises at least the dispensing of building material.

7. The method as claimed in claim 1, wherein step a) comprises:
   dispensing building material with the marking substance admixed therein.

8. The method as claimed in claim 1, wherein, in the second region, no installation structure is concealed.

* * * * *